United States Patent [19]

Boberg et al.

[11] Patent Number: 4,778,312
[45] Date of Patent: Oct. 18, 1988

[54] BLIND HOLE DRILLING COOLANT REMOVER AND TAPPING FLUID INJECTOR AND METHOD

[75] Inventors: Mark C. Boberg, Issaquah; Galen R. Wright, Auburn, both of Wash.

[73] Assignee: The Boeing Company, Seattle, Wash.

[21] Appl. No.: 50,817

[22] Filed: May 15, 1987

[51] Int. Cl.⁴ .................. B23B 35/00; B23B 47/34
[52] U.S. Cl. .................................. 408/1 R; 10/106; 141/92; 184/27.1; 417/555.1; 408/56; 408/61; 409/137; 29/DIG. 50
[58] Field of Search ............... 222/402.2, 321; 184/27.1, 109; 417/555.1, 258, 599.2; 141/90, 92; 29/DIG. 50, DIG. 54, DIG. 63, DIG. 68, DIG. 78; 408/56, 61, 1 R; 409/135, 136, 137; 10/106

[56] References Cited

U.S. PATENT DOCUMENTS

| Re. 26,975 | 10/1970 | Borman et al. | 408/59 |
| 1,630,835 | 5/1927 | Doyle | 408/61 |
| 2,686,440 | 8/1954 | Van Cutsem | 408/61 |
| 2,946,244 | 7/1960 | Maynard | 408/59 |
| 3,561,299 | 2/1971 | Brisk et al. | 408/59 |
| 4,095,916 | 6/1978 | Hammond | 408/1 R |
| 4,345,668 | 8/1982 | Gaunt | 184/29 |
| 4,529,340 | 7/1985 | O'Dell | 408/1 R |
| 4,534,803 | 8/1985 | Asano et al. | 409/137 |
| 4,555,047 | 11/1985 | Ackley | 222/192 |

FOREIGN PATENT DOCUMENTS

| 9827 | 3/1974 | Japan | 409/137 |
| 112708 | 8/1980 | Japan | 409/137 |
| 102553 | 6/1984 | Japan | 408/56 |
| 126620 | 1/1920 | United Kingdom | 408/56 |
| 1435166 | 5/1976 | United Kingdom | |

*Primary Examiner*—Gil Weidenfeld
*Assistant Examiner*—Daniel W. Howell
*Attorney, Agent, or Firm*—Eugene O. Heberer

[57] ABSTRACT

A method and tool (12) for use in an automatic machining center for removing drilling coolant from a blind hole (14) and for injecting tapping fluid into the hole (14), the tool having a nozzle (24) for removing the coolant from the hole and for injecting tapping fluid into the hole.

15 Claims, 3 Drawing Sheets

BLIND HOLE DRILLING COOLANT REMOVER AND TAPPING FLUID INJECTOR AND METHOD

TECHNICAL FIELD

The invention relates to a tool for removing drilling coolant from a blind hole and for injecting tapping fluid into the hole. The tool is for use on an automatic machining center.

BACKGROUND ART

The tapping of blind holes in an automatic machining center requires the application of a specialized tapping fluid to reduce friction and reduce tap breakage. Tapping fluids are typically viscous, are expensive, and cannot be used as a general purpose coolant in a machining operation. The coolant is nonviscous and may be used in relatively large volumes because it is inexpensive.

In the present automatic machining centers, a machine operator must stop the machining center prior to a blind hole tapping operation and blow accumulated general purpose coolant or other loose materials out of blind holes, and then fill the holes with tapping fluid. It is desired that automatic machining centers be unmanned but there has been no automatic process for removing the coolant from the holes and then injecting the proper amount of tapping fluid into the holes. A manual operation for removing the coolant and injecting the tapping fluid has been unsatisfactory for unmanned machining operations, such as flexible machining systems.

A search of the patent literature discloses structures for delivering liquid coolants, lubricants or cutting oils to a drill or cutter. Various pumps, storage reservoirs and air supply systems are described that will meter, spray or flood a workpiece for the purpose of prolonging tool life and protect from overheating. For example, U.S. Pat. No. 4,555,047 to Ackley discloses a tapping lubricant dispenser for use in numerically controlled automatic tool changing systems to dispense tapping lubricant into a previously drilled hole before tapping.

The following additional patents disclose systems for delivering coolants or lubricants to a drill or cutter:

| Patent No. | Patentee |
|---|---|
| U.S. 1,630,835 | J. W. Doyle |
| U.S. 2,686,440 | A. T. Van Cutsem |
| U.S. 2,946,244 | H. J. Maynard |
| U.S. Re. 26,975 | J. W. Borman et al. |
| U.S. 3,561,299 | C. W. Brisk et al. |
| U.S. 4,095,916 | Hammond |
| U.S. 4,345,668 | Gaunt |
| U.S. 4,529,407 | O'Dell |
| G.B. 1,435,166 | Nagel Maschinen-Und Werkseugfabrik GMBH |

DISCLOSURE OF THE INVENTION

The invention is a method and tool for removing drilling coolant from a blind hole and for ejecting tapping fluid into the hole. The tool is made for use on an automatic machining center which is unmanned. In the system, there is an automatic tool changer which inserts the inventive tool into a spindle on the machining center after blind holes have been drilled. The spindle is programmed to move the tool into communication with each of the blind holes, to operate the tool to remove the drilling coolant from the blind hole, and then to inject the proper amount of tapping fluid into the hole.

A unique feature of the invention is to blow coolant or other loose material out of blind holes prior to the injection of the tapping fluid. This is accomplished without the assistance of outside power or compressed air supply. The entire operation is controlled by a machine spindle which moves an internal cylinder within the tool and a tool nozzle in a blind hole. This action causes air within the tool to be compressed and in the same motion after the compression of the air, the air is released to blow the coolant and other loose material out of the hole. The tool, except for the nozzle, is then raised with respect to the hole, and as it is being raised, tapping fluid is forced out of the tool through the nozzle to inject the proper amount of tapping fluid into the hole. The tool is then moved automatically, as programmed, by the spindle to the next hole.

The nozzle extends from one end of a tool housing and the nozzle within the housing is connected to one end of a piston slidably engaged within the cylinder in the housing. The housing is adapted to the move relative to the piston and there is a spring abutting the other end of the piston within the housing so as to normally bias the nozzle to extend outwardly of the housing. When the housing is moved to exert pressure on the discharge end of the nozzle in a hole, the housing is moved towards the nozzle.

There is an air chamber within the housing adjacent the other end of the piston and cylinder, and when the housing is moved relative to the piston towards the hole against the force of the spring, air is compressed in the air chamber. When the housing has been moved sufficiently to compress the air the proper amount, a discharge passage through the piston and nozzle communicates with the compressed air so that the air passes from the housing through the piston and nozzle to blow the coolant out of the hole. There are means in the air chamber to limit the movement of the housing toward the hole when the air is being compressed.

There is a tapping fluid reservoir connected to the housing adjacent to the one end of the piston and cylinder and as the housing is moved to compress the air, a supply line to the tapping fluid reservoir is opened to cause tapping fluid to be moved into the housing by suction created by movement of the housing toward the hole and relative to the one end of the piston. This movement provides a space in the cylinder. While the air is being compressed, the space in the cylinder is filled with the tapping fluid.

After the coolant has been removed from the hole, the spindle then moves the housing away from the hole a programmed amount and the spring abutting the piston holds the nozzle in the hole. As the housing is moved away from the hole, the space at the one end of the piston is decreased to apply pressure to the tapping fluid which is then forced into the discharge passage through the piston and nozzle to be injected into the hole.

There is an overtravel spring which permits a retainer at the other end of the first spring to be moved in the event that too much pressure is applied to the nozzle in the hole. The overtravel spring is substantially stronger than the first spring and thus would not be activated except when an unusual amount of additional force is applied to the nozzle.

The tool has the advantage of being operable entirely by the spindle motion, toward and away from the hole, and it requires no additional power to compress the air which is drawn into the housing from the ambient environment. There is also no external power required to draw the tapping fluid into the housing or to apply pressure to it to force it into the tapping hole.

Further advantages of the invention may be brought out in the following part of the specification wherein small details have been described for the competence of the disclosure, without intending to limit the scope of the invention which is set forth in the appended claims.

BRIEF DESCRIPTION OF THE DRAWINGS

Referring to the accompanying drawings which are for illustrative purposes, like reference numerals designate like parts throughout the various views and.

BEST MODE FOR CARRYING OUT THE INVENTION

Figure 1:
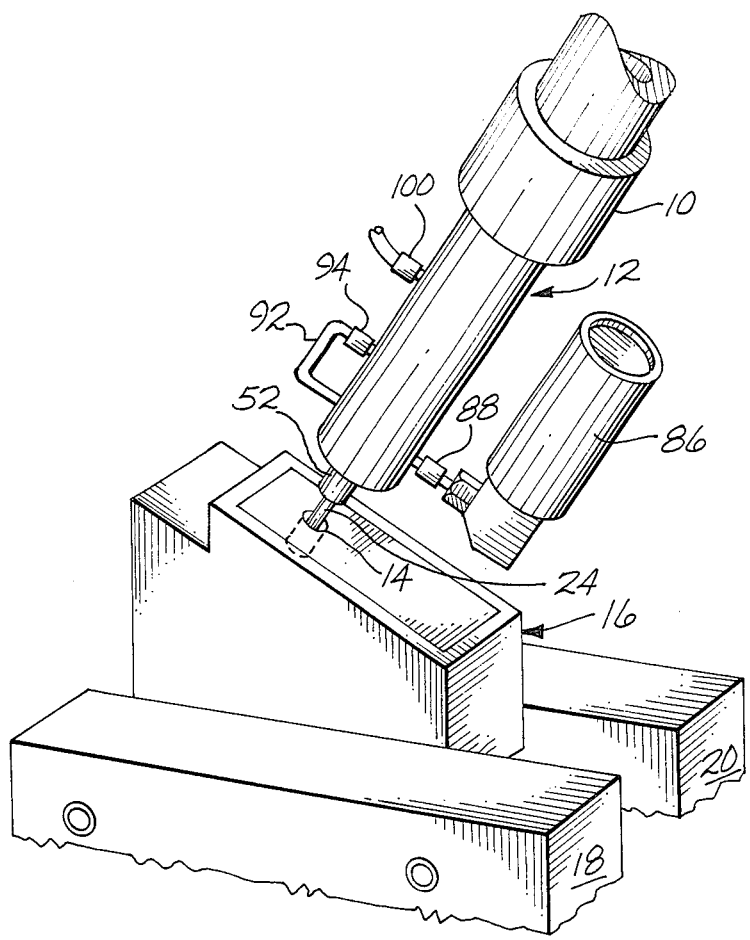
FIG. 1 is a pictorial view of a tool according to the invention engaged within a drilled hole within a workpiece, the tool being attached to a fragmentarily shown spindle on an automatic machining center.

Referring again to the drawings, there is shown in FIG. 1 a fragmentary view of an automatic tool changing spindle 10 connected for use on an automatic machining center, not shown. The spindle 10 is connected for operation to a tool 12 for removing drilling coolant from a blind hole, as 14, and for injecting tapping fluid into the hole. The hole 14 is in a workpiece 16 secured on a work bench by blocks 18 and 20.

The spindle 10 is programmed to remove the tool 12 from a tool rack and carry it to the workpiece and insert a nozzle 24 on the tool into holes as 14, and as it is moved from hole to hole, it blows the coolant and other loose material out of the holes and then injects a proper amount of tapping fluid into the holes.

The tool 12 is in the form of a cylindrical housing and at its one end 28, FIGS. 2-5, has a small diameter cylindrical opening 30. Inwardly of the opening 30 is a cylindrical passage 32, extending from the smaller diameter portion 30 to an enlarged diameter annular groove 34. Slidably engaged within the cylindrical passage 32 is a piston 36. The piston has a portion 38 at one end and adjacent the one end is an annular groove 40 having an annular seal 42 therein. At the other end of the piston there is an annular groove 44 having an annular seal 46. The seals 42 and 46 are engaged with the surface of the cylindrical passage 32. Extending between the seals longitudinally is a first annular space 48 formed between the piston and the surface of the cylindrical passage 32. Similarly, around the piston portion 38, there is a second annular space 50 formed between the portion and the surface of the cylindrical passage 32.

Extending outwardly of the tool housing and connected to the piston 36 is a small diameter extension 52 to which the nozzle 24 is threadedly engaged. The extension 52 is sealingly engaged in the small diameter portion 30 by an annular seal 54.

Figure 2:
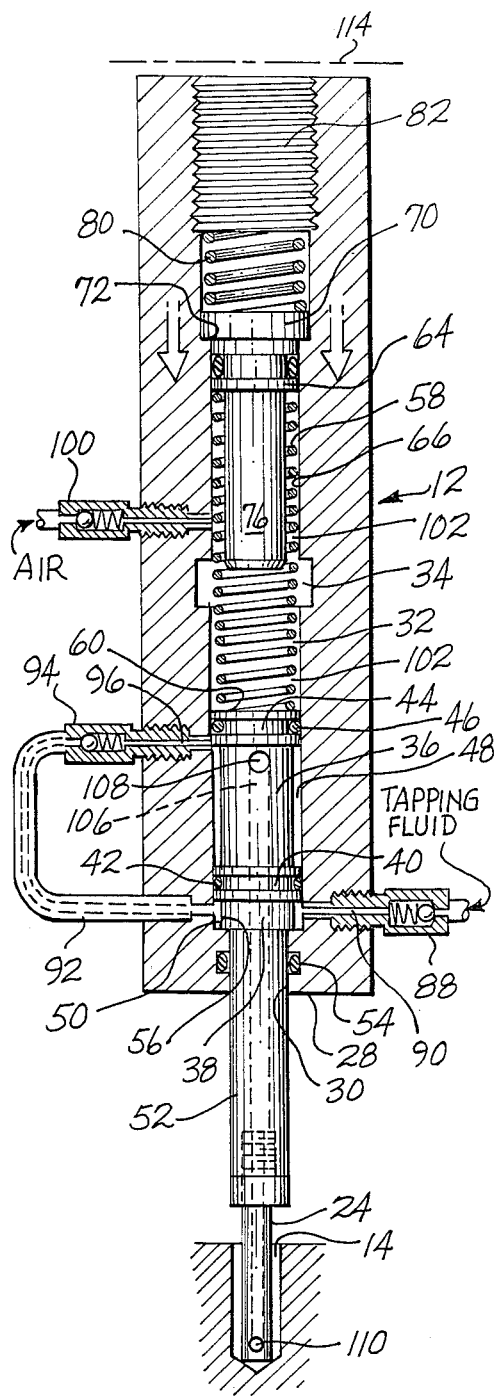
FIG. 2 is a cross-sectional elevational view of the tool with its nozzle extending into a blind hole, the nozzle being in its normally spring-held fully extended position.

In FIG. 2 the tool 12 is shown in a normally inoperative position with the nozzle fully extended and the piston held in abutment with one end 56 of the cylindrical passage by means of a spring 58. The spring has one end in abutment with the other end 60 of the piston and having its other end in abutment with a spring retainer 64, sealingly engaged with a second cylindrical portion 66 in alignment with the cylindrical passage 32 and of the same or larger diameter.

The spring retainer 64 has a large diameter flange 70 in abutment with an annular shoulder 72 at the end of the cylindrical portion 66. The shoulder 72 prevents movement of the spring retainer toward the enlarged diameter annular groove 34.

Figure 4:
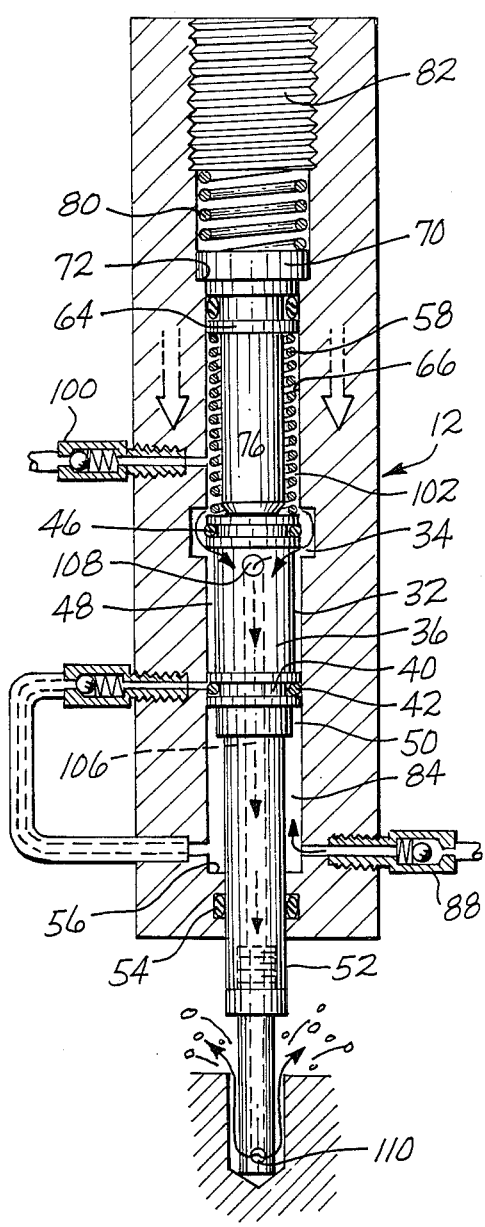
FIG. 4 is a view similar to FIG. 3, except that the housing has been moved farther downwardly toward the hole after the air has been fully compressed, so that the compressed air is in communication with a discharge passage through the piston and nozzle and into the hole, whereby the compressed air blows the coolant and other loose material out of the hole.

Extending from the lower end of the retainer 64 is a pin 76 which limits movement of the housing toward the hole 14 by abutment with the end of the piston 60, FIG. 4, the lower end of the nozzle being against the hole 14.

In abutment with the flange 70 of the spring retainer is an overtravel spring 80 having a substantially greater biasing force than the spring 58. At its upper end the spring 80 is in abutment with a set screw 52 threadedly engaged in the upper end of the housing.

A tapping fluid reservoir 86, FIG. 1, is connected to supply tapping fluid through a normally closed check valve 88 to part 84, forming a tapping fluid chamber in the cylindrical passage 32. The valve 88 is comprised of a ball held in a closed position by a spring and forms a first inlet along with a tube 90. Also connected to the part 84 of the cylindrical passage is a tapping fluid outlet 92 which is connected to a second normally closed tapping fluid inlet in the form of a check valve 94. The check valve is of the same type as in the first inlet and a ball valve is held in the closed position by a spring. The second inlet 94 is connected by a tube 96 to a generally central portion of the cylindrical passage 32.

An air inlet 100 is connected to an air chamber 102 to supply ambient air to the chamber. The inlet is comprised of a normally closed check valve of the same type as valves 88 and 94. The air chamber extends in the cylindrical spaces above the piston end 60 to the spring retainer 64.

A discharge passage 106 extends through the piston 36, the extension 38 and the nozzle 24. An inlet 108 to the discharge passage is open to the wall of the piston between the annular seals 42 and 46 and is connected to the annular space 48 surrounding the piston in the cylindrical passage. At the lower end of the discharge passage 106 is a discharge outlet 110 in the nozzle.

Figure 5:
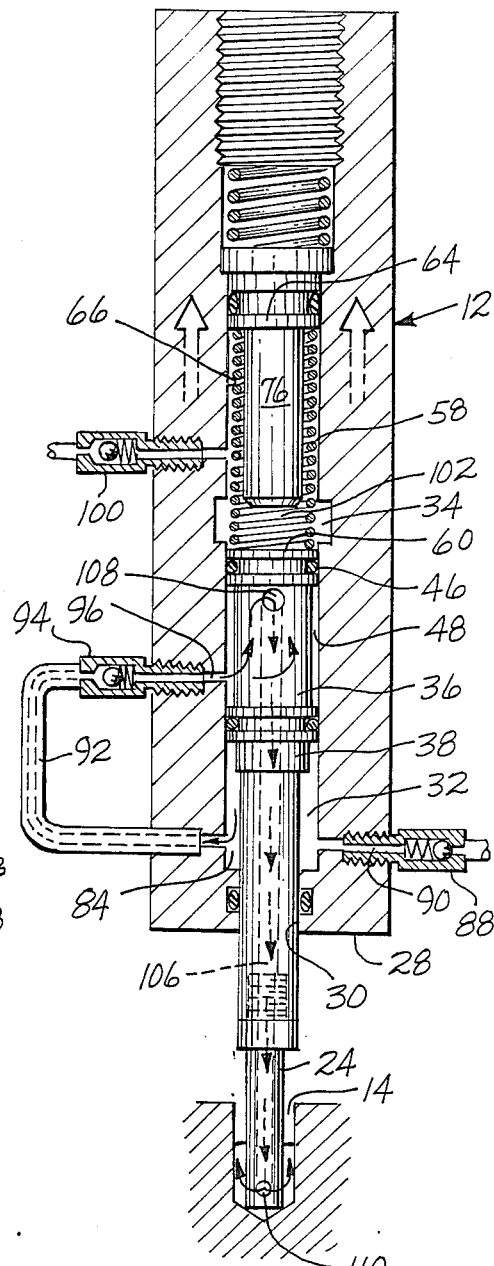
FIG. 5 is a view of the tool with the nozzle in the hole after the housing has been moved away from the hole, relative to the piston, so as to apply pressure to the tapping fluid and to cause the tapping fluid to be communicated to the discharge passage through the piston so that it is injected into the hole through the nozzle.

The tool may be prepared for operation, by sliding the housing on the piston in the direction of the arrows in FIG. 2 and returning the housing in the direction of the arrows as indicated in FIG. 5 to the normally piston biased position shown in FIG. 2, whereby air will be permitted to enter the air chamber and tapping fluid will be caused to enter the first tapping fluid inlet 88 and 90, the annular space 50 in FIG. 2, and the outlet 92. The foregoing may be accomplished by hand movement of the housing with respect to the cylinder or may be operated by the spindle 10 with the nozzle 24 as shown in the hole 14. The foregoing means for preparing the tool for operation will be illustrated in the following description of the operation.

In an automatic machine center, when the blind holes, as 14, have been drilled and are ready for tapping, a spindle as 10 grips the tool and carries it to the individual holes as shown in the drawings. The first phase of the operation is indicated in FIG. 2 where the nozzle 24 is inserted into the hole and the cylindrical housing has not been moved with respect to the piston and no pressure has been applied on the nozzle except by the spring 58, shown to be holding the nozzle in the most extended position relative to the tool housing. The broken line 114 at the top of the figures provides a reference line to indicate the movement of the housing with respect to the piston 46 within the housing.

Figure 3:
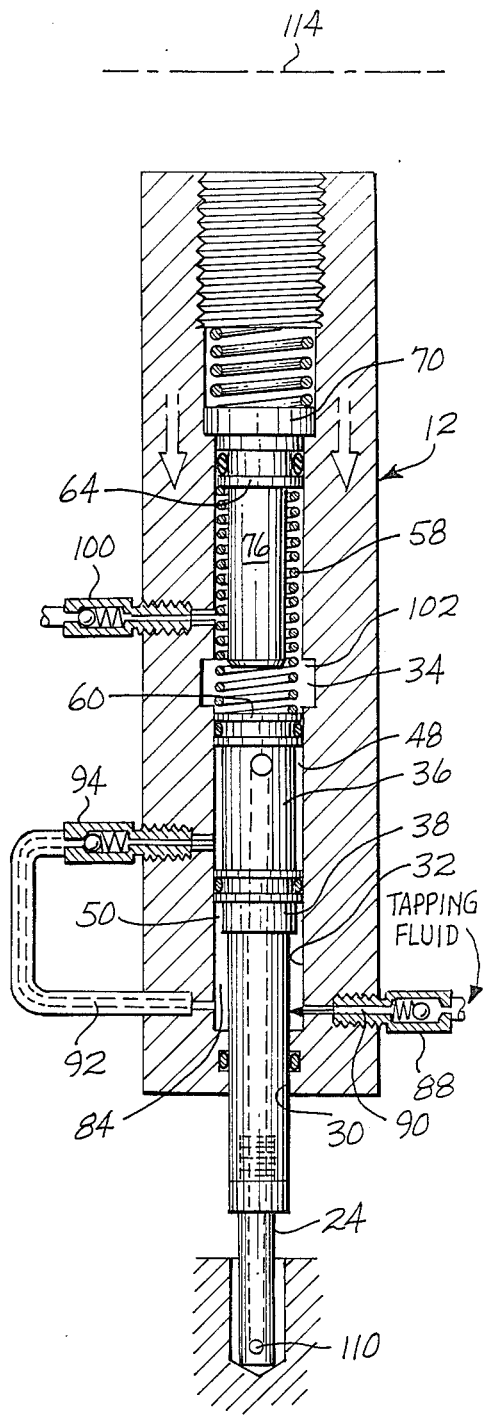
FIG. 3 is a cross-sectional elevational view of the tool, illustrating the position of the tool after the spindle has moved the housing downwardly relative to a piston to compress air in an air chamber.

In FIG. 3 the housing has been moved downwardly relative to the piston 36 so that the piston has compressed air in the air chamber 102. The annular groove 34 has been moved to be adjacent the piston end 60, and thus the air above the end 60 in FIG. 2 up to the spring retainer at 64 has been compressed. During the movement of the housing downwardly, in the fluid chamber 84, a suction has been created so as to open the check valve 88 and cause tapping fluid to flow from the reservoir 86 into the annular volumes surrounding the lower end 38 of the piston and the extension 52. The suction thus formed, FIG. 3, will aid in maintaining the closure of the check valve 94. Because the outlet 92 will have been prefilled, tapping fluid generally will not flow therein.

After the enlarged annular groove 34 has been moved to be adjacent the upper end of the piston 60, the air has been completely compressed and the operation, FIG. 4, continues so as to move the housing downwardly to surround the upper end of the piston and the seal 46 by the annular groove 34 so as to create a passage around the seal 46 from the compressed air in the air chamber into the discharge passage 106 through the annular space 48 and the opening 108 in the piston. The compressed air then moves downwardly through the passage out of the opening 110 to blow the drilling coolant and any loose material out of the blind hole 14. During this movement of the housing the volume around the piston extension 38 and the extension 52 in the cylindrical passage 32 (fluid chamber 84) has been increased, FIG. 4, and additional tapping fluid has been sucked through the check valve 88 into the fluid chamber.

As may be noted in FIG. 2, during the initial part of the housing movement when the check valve 88 would first open, the fluid would flow into the cylindrical passage and some would flow against the seal 42 if it were positioned at the extreme lower end of the piston. Thus, the purpose of having the piston part 38 below the seal is to avoid any wear on the seal 42.

In accordance with the programming of the spindle 10 after the housing has moved low enough to expel the coolant from the hole, the housing is then moved upwardly away from the hole as indicated in FIG. 5. When this movement starts the spring 58 acts to hold the nozzle in the hole. As the housing moves up away from the hole its relative movement to the piston decreases the volume in the fluid chamber 84 in the cylindrical passage 32 below the piston. This increases the pressure below the piston causing the check valve 88 to be closed, causing tapping fluid to be pumped out of the fluid chamber 84 through the fluid outlet 92 and causes the check valve 94 to be opened to pump fluid into the annular space 48 around the piston 36 between the seals 42 and 46 and into the discharge passage opening 108 in the piston. The tapping fluid is then continually pumped through the discharge passage and out of the nozzle opening 110 as the tool housing is moved upwardly relative to the piston.

According to the programming of the amount of tapping fluid to be pumped into a hole, depending on its depth, the upward movement of the piston will be thereby limited. When the proper amount of tapping fluid has been pumped into the hole, the spindle 10 will then lift the tool away from the hole and insert the nozzle into another hole or return the tool to the tool rack until it is needed for further supplying of tapping fluid to blind holes.

As shown in FIG. 4 when the piston end 60 is moved into the annular groove 34 it will abut the limit pin 76 to prevent farther downward movement of the housing. This amount of movement would permit a sufficient amount of compressed air to be discharged into the hole to remove all of the coolant. In the event that there would be some kind of failure or mistake in the programming or peculiarity in the size of the hole 14 and the housing continued to move downwardly after the limit pin 76 made contact with the end 60 of the piston, the overtravel spring 80 would be compressed to allow the spring retainer flange 70 to move upwardly with respect to the housing and relieve pressure on the nozzle to avoid damage thereto.

As the housing is moved upwardly while pumping tapping fluid into the hole, a suction is created in the air chamber so as to cause the check valve 100 to open to draw ambient air therein. As the tapping fluid is pumped out of the cylindrical passage 32 (fluid chamber 84), spring 58 will continue to move the housing upwardly so as to position the bottom 56 of the cylindrical passage in contact with the piston part 38 and during this time the air will continue to flow into the open inlet 100 to fill the air chamber with uncompressed ambient air. The tool will then be returned to the position shown in FIG. 2 with the air chamber filled and check valve 100 closed. The first tapping fluid inlet 88 will be closed and the tube 90 will contain tapping fluid. The tapping fluid outlet 92 will be filled to the closed delivery line check valve 94.

The invention and its attendant advantages will be understood from the foregoing description and it will be apparent that various changes may be made in the form, construction, and arrangement of the parts of the invention without departing form the spirit and scope thereof or sacrificing its material advantages, the arrangements herein before described being merely by way of example. We do not wish to be restricted to the specific form shown or uses mentioned except as defined in the accompanying claims.

What is claimed is:

1. A tool for removing a drilling coolant from a blind hole and for injecting tapping fluid into the hole, comprising:

a nozzle for first removing drilling coolant from a blind hole and then injecting tapping fluid into the hole;

said nozzle extending from one end of a tool housing and spring means in the housing for normally biasing the nozzle outwardly of the housing;

the nozzle having a discharge end being positionable in the hole so as to be biased thereagainst by the spring means;

a piston in the housing in a cylindrical passage and being connected at one end to move with the nozzle and relative to the housing and cylindrical passage, so that when the housing is moved to exert pressure on the discharge end of the nozzle in the hole, the housing is moved toward the nozzle;

an air chamber being within said housing adjacent the other end of said piston away from the nozzle and partially within said cylindrical passage, the piston being biased by the spring means to normally be intermediate the nozzle and air chamber; the piston being in communication with the air chamber a normally closed air inlet to said air chamber, the air inlet being opened to allow air into the chamber by a suction in the air chamber created by housing movement away from the nozzle and relative to the piston;

the air in the chamber being compressed when the housing is moved toward the hole and relative to the piston;

means in the air chamber to limit movement of the housing toward the hole to compress the air;

a discharge passage through the piston and nozzle for discharge from the nozzle into the hole;

means in the air chamber for connecting the air chamber to the discharge passage in the piston when the housing is moved to the limit possible to compress the air, whereby the compressed air passes through the discharge passage and out of the nozzle to remove coolant and other loose material from the hole;

a normally closed tapping fluid supply line connected to the housing, said supply line being connected to the cylindrical passage adjacent an end thereof proximate to the hole;

said supply line being opened by movement of the housing toward the hole and relative to the piston, a suction being created in the cylindrical passage between the hole and the piston to draw tapping fluid therein from a source externally of the housing and connected to the supply line; and a tapping fluid delivery line having one end connected to the cylindrical passage adjacent its end proximate to the hole, said delivery line being normally closed and having another end connected to the cylindrical passage intermediate the ends of the piston and open to the piston discharge line when the housing has been moved away from the hole so that pressure in the tapping fluid in the cylindrical passage adjacent the end proximate to the hole has been increased to close the supply line, to open the delivery line and to pump tapping fluid into the piston discharge line and out of the nozzle into the hole for tapping.

2. The invention according to claim 1, in which:
said tool is fitted into a spindle in an unmanned automatic machining center;
the spindle being operative to move the nozzle into and out of holes to be tapped, and to move the housing relative to the piston when the nozzle is in a hole.

3. The invention according to claim 1 in which:
said piston has a small diameter extension at one end extending outwardly of said housing, the nozzle being connected to said extension;
the discharge passage extending through said extension and terminating in an outer end of the nozzle.

4. The invention according to claim 3 in which:
said spring means normally retaining said one end of said piston adjacent one end of said housing proximate to said nozzle;
said piston having an annular seal adjacent each of its ends and forming seals between the piston and the cylindrical passage;
a first annular space between the piston and cylindrical passage extending longitudinally between the piston seals;
one end of said cylindrical passage terminating adjacent said one housing end and the other cylindrical passage end terminating adjacent said means to limit movement of the housing toward the hole.

5. The invention according to claim 4 in which:
said means in the air chamber for connecting the air chamber to the discharge passage being an enlarged diameter annular groove and into which the other end and seal of said piston extends when the housing is moved to the limit possible to compress the air,
said other cylindrical passage end terminating at said enlarged diameter annular groove;
said discharge passage in the piston being open to said first annular space and to said annular groove when the piston other end is in said annular groove.

6. The invention according to claim 5 in which:
said piston having a portion thereof at said one end internally of said cylindrical passage and extending between said small diameter extension and said seal adjacent said piston one end;
a second annular space between said piston portion and the cylindrical passage;
said tapping fluid supply line and said tapping fluid delivery line one end being connected to said second annular space and sealed from said first annular space by said seal adjacent said piston one end, when said spring means is normally retaining said one end of said piston adjacent one end of said housing proximate to said nozzle.

7. The invention according to claim 4 in which:
said means in the air chamber for connecting the air chamber to the discharge passage being an enlarged diameter annular groove and into which the other end and seal of said piston extends when the housing is moved to the limit possible to compress the air,
said discharge passage in the piston being open to said first annular space and to said annular groove when the piston other end is in said annular groove;
one end of said spring means normally abuts the other end of said piston in said air chamber, the piston normally forming one end of said air chamber, the other end of the spring means abutting the other end of the air chamber.

8. The invention according to claim 7 in which:
said means in the air chamber to limit movement of the housing toward the hole to compress the air is a stop adjacent the enlarged diameter annular groove; said stop being for stopping movement of the housing toward the hole when the other end of the piston abuts the stop and the piston extends into the annular groove.

9. The invention according to claim 7 in which:
the other end of the air chamber is formed by a spring means retainer sealingly engaged within a cylindrical portion of the housing; said retainer being connected to said stop;
the retainer being fixed against movement toward the spring means;
an over travel spring in the housing between the retainer and a spring retaining screw threadedly engaged in the other end of the housing;
said over travel spring having substantially greater biasing force than said spring means so as to normally prevent movement of said retainer toward said housing other end, said over travel spring being provided to permit movement of the retainer toward the other end of the housing when the housing is moved an excessive distance toward the hole, whereby damage to the nozzle tends to be prevented.

10. The invention according to claim 6 in which:
said source connected to the tapping fluid supply line is a tapping fluid reservoir;
said tapping fluid supply line being normally closed by a check valve biased to close toward the reservoir;
said tapping fluid delivery line being normally closed by a check valve biased to close toward the cylindrical passage adjacent the end proximate to the hole;
said air inlet being normally closed by a check valve biased to close away from the air chamber.

11. A tool for removing drilling coolant from a blind hole and for injecting tapping fluid into the hole, comprising:
a housing;
a generally cylindrical passage within said housing;
a piston for relative reciprocating travel within said cylindrical passage by movement of said housing relative to the piston;
a small diameter extension connected to said piston adjacent one end thereof, for relative movement in said cylindrical passage and outwardly of one end of said housing; said small diameter extension being in a sealed relationship in a cylindrical portion of said housing of smaller diameter than said cylindrical passage, said portion being between said cylindrical passage and said one end of said housing;
a nozzle on an outer end of said extension outwardly of said housing, for insertion into a blind hole for the removal of coolant from the hole and inserting tapping fluid into the hole;
a discharge passage extending through said piston, said extension, and said nozzle;
spring means within said housing having one end adjacent the other end of said piston for biasing the piston so that said one end thereof is normally adjacent said smaller diameter cylindrical portion of said housing and within the cylindrical passage;
said piston having an annular seal adjacent each of its ends and for forming seals between the piston and the cylindrical passage;
an annular space between the piston and cylindrical passage extending longitudinally between the piston seals;
said cylindrical passage terminating inwardly longitudinally from said one housing end at an enlarged diameter annular groove and into which the other end and seal of said piston may extend as the result of movement of the housing relative to the nozzle against the hole;
means in the housing adjacent said enlarged diameter groove for limiting movement of the housing relative to the piston and nozzle in the direction toward the nozzle in the hole;
an air chamber in said housing including at one end thereof a part of said cylindrical passage terminating at said enlarged diameter annular groove; said air chamber being connected to said groove and being connected to a normally closed air inlet, said air inlet being opened by a suction in the air chamber created by housing movement away from the hole relative to the piston and along with the spring means biasing the piston away from the annular groove and into sealing relationship at both ends in the cylindrical passage;
said air chamber being sealed when said air inlet is closed and said piston seals are in sealing relationship with said cylindrical passage, whereby when said housing is moved relative to said piston and nozzle toward said hole, air is compressed in the air chamber until the piston seal at the other end extends into said enlarged annular groove;
said discharge passage being open through said piston into said annular space between said piston seals and being connected to said air chamber when said piston seal at the other end extends into said enlarged annular groove, whereby compressed air flows from said air chamber and out of said nozzle to blow coolant out of the hole;
a first normally closed tapping fluid inlet into said cylindrical passage, said first fluid inlet being openable by suction in said cylindrical passage between said one end of said piston and said cylindrical portion and being maintained closed by pressure in said tapping fluid in said cylindrical passageway;
a tapping fluid outlet from said cylindrical passage adjacent said one end of said piston and said cylindrical portion; and
a second normally closed tapping fluid inlet connected to said outlet and being connectable to said annular space in said cylindrical passage between said piston seals when said enlarged diameter annular groove has been moved with said housing away from said piston other end and seal so that the piston seals are in the cylindrical passage, and the second inlet then being connected to said annular space between the piston seals and to the discharge passage;
said first fluid inlet being opened by suction when said enlarged diameter annular groove is moved toward said piston with said housing so as to fill a space in said cylindrical passage between said piston one end and said smaller diameter cylindrical portion with tapping fluid, and fill said outlet with tapping fluid; the space in the cylindrical passage between the piston one end and the smaller diameter cylindrical portion and outlet being filled from a tapping fluid source connected to the first inlet;
said second fluid inlet being opened by pressure in the tapping fluid and in the space in the cylindrical passage between the piston one end and the smaller diameter cylindrical portion when said enlarged diameter groove is moved away from said other end of said piston, and tapping fluid is moved into said discharge passage and out of said nozzle into the hole, at which time suction is created in said air chamber to open the air inlet and allow air to enter the air chamber.

12. The invention according to claim 11 in which:

the other end of the air chamber is formed by a spring means retainer, the other end of the spring means abutting one end of the retainer; the retainer being sealingly engaged within the housing;

said retainer being connected to said means for limiting movement of the housing relative to the nozzle in the direction toward the nozzle in the hole;

the retainer being fixed against movement toward the spring means;

an overtravel spring in the housing between the other end of the retainer and a spring retaining screw threadedly engaged in the other end of the housing;

said overtravel spring having substantially greater biasing force than said spring means so as to normally prevent movement of said retainer toward said housing other end, said overtravel spring being provided to permit movement of the retainer toward the other end of the housing when the housing is moved an excessive distance toward the hole, whereby damage to the nozzle tends to be prevented.

13. A method of removing drilling coolant from a blind hole and for injecting tapping fluid into the hole, comprising:

moving a tool having a tapping fluid source and an air source toward a blind hole containing drilling coolant;

inserting a nozzle extending from one end of a tool housing into a blind hole containing drilling coolant, said nozzle being fitted for reciprocating movement with respect to said housing and said nozzle being normally biased to extend out of said housing;

moving the housing to force the nozzle against the hole;

moving the housing, relative to the nozzle, toward the hole to compress air in an air chamber in the housing and to draw tapping fluid into a tapping fluid chamber in the housing from a fluid source connected to the fluid chamber;

moving the housing, relative to the nozzle, farther toward the hole to connect the compressed air in the air chamber to a discharge passage in the housing and connected to the nozzle and to draw additional fluid into the fluid chamber;

flowing compressed air from the air chamber through the discharge passage and out of the nozzle into the hole to blow coolant and other loose material out of the hole;

moving the housing away from the hole and relative to the nozzle, the nozzle being biased toward the hole, to draw air into the air chamber, to connect the fluid chamber to the discharge passage; to apply pressure to the fluid in the fluid chamber to force fluid through the discharge passage and out of the nozzle into the hole; and removing the nozzle from the hole.

14. The method according to claim 13 including:

moving a cylinder in and with the housing when the air is being compressed and the tapping fluid is being drawn into the fluid chamber;

the cylinder carrying a piston for relative movement thereto, the piston being connected at one end to the nozzle, the discharge passage extending from the other end of and through the piston and nozzle;

the tapping fluid chamber being formed at one end of the housing within one end of the cylinder and being increased in volume as the housing is moved toward the hole;

the air chamber being formed in part in the other end of the cylinder and extending beyond the other end of the cylinder toward the other end of the housing;

the air being compressed in the air chamber as the other end of the cylinder is moved toward the hole and piston to decrease the volume of the air chamber.

15. The method according to claim 14 including:

moving an enlarged diameter groove in and with the housing and adjacent the other end of the cylinder to surround and be spaced from the other end of the piston to connect the air chamber and compressed air to the discharge passage in the piston and nozzle;

the tapping fluid chamber being connected to the discharge passage by a tube extending from one end of the cylinder to an annular sealed space between the cylinder and piston connectd to the discharge passage in the cylinder;

said tube being normally closed and being opened by applying pressure to fluid in the fluid chamber;

a normally closed fluid inlet from the fluid source to the fluid chamber, said fluid inlet being opened by a suction created in the fluid chamber when the housing is moved toward the hole and fluid is drawn into the fluid chamber from the source; and a normally closed air inlet to the air chamber, said air inlet being opened by a suction created in the air chamber when the housing is moved away from the hole.

* * * * *